Oct. 2, 1923.  1,469,337
E. M. SANBORN
BACKING ALARM AND SIGNAL FOR AUTOMOBILES
Filed July 14, 1919   2 Sheets-Sheet 1
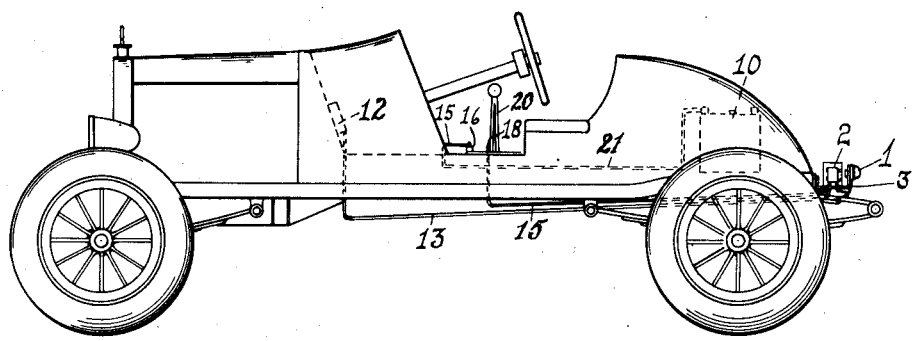
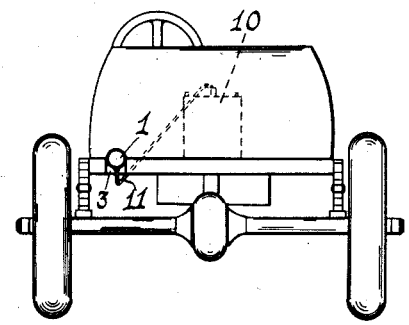
Inventor
*Edgar M. Sanborn.*
By Harry C. Schroeder
Attorney Oct. 2, 1923.

E. M. SANBORN 1,469,337

BACKING ALARM AND SIGNAL FOR AUTOMOBILES

Filed July 14, 1919  2 Sheets-Sheet 2

Inventor
Edgar M. Sanborn.

By Harry C. Schroeder
Attorney

Patented Oct. 2, 1923.

1,469,337

UNITED STATES PATENT OFFICE.

EDGAR M. SANBORN, OF OAKLAND, CALIFORNIA.

BACKING ALARM AND SIGNAL FOR AUTOMOBILES.

Application filed July 14, 1919. Serial No. 310,798.

*To all whom it may concern:*

Be it known that I, EDGAR M. SANBORN, a citizen of the United States, residing at Oakland, in the county of Alameda and State of California, have invented certain new and useful Improvements in Backing Alarms and Signals for Automobiles, of which the following is a specification.

My invention is a backing alarm and signal for automobiles.

In this specification and the annexed drawings I disclose my invention in the form which I consider the best, but I do not limit my invention to such form because it may be embodied in other forms, and it is to be understood that in and by the claims following the description herein I intend to cover my invention in whatever form it may be embodied.

Referring to the annexed drawings, forming a part of this specification:

Figure 1 is a side elevation of an automobile with my backing alarm and signal mounted thereon.

Figure 2 is a rear elevation of said automobile and my invention mounted thereon.

Figure 3:
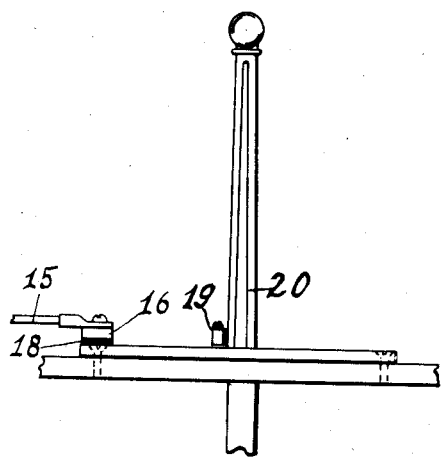
Figure 3 is a view in side elevation showing the gear shift lever of the automobile and the contacts for controlling the circuit of my alarm and signal.
Figure 4:
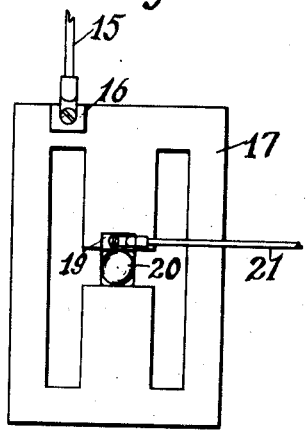
Figure 4 is a plan of the parts shown in Fig. 3.
Figure 5:
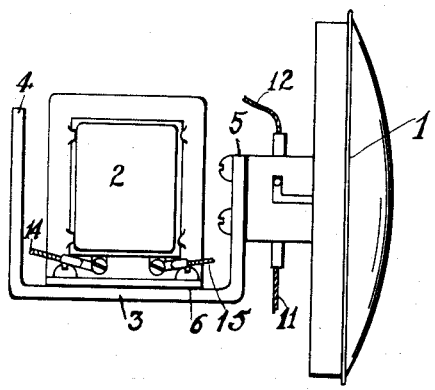
Figure 5 is a side view of the tail lamp and buzzer.

In the drawings 1 indicates an automobile tail lamp, 2 a buzzer and 3 a U-shaped bracket. The forward arm 4 of said bracket is secured to the rear of the automobile while the lamp 1 is mounted on the rear arm 5 of the bracket. The buzzer 2 is secured to the connecting member 6 of said bracket in an upright position between the arms 4 and 5.

Figure 6:
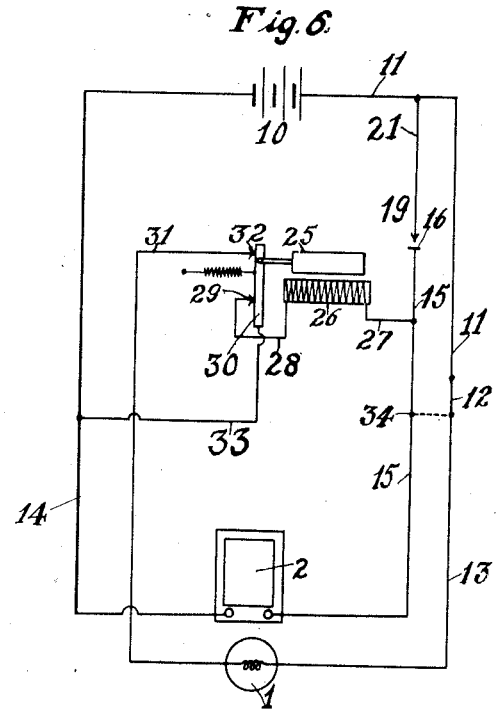
Figure 6 is a diagram of my invention.

The lamp 1 and buzzer 2 are included in a circuit illustrated in Fig. 6, which will now be described. From one pole of a battery 10 extends a lead 11 which connects to one terminal of a two-way switch 12, the central terminal of which is connected by a lead 13 to one terminal of lamp 1. The other pole of battery 10 is connected by a lead 14 to one terminal of buzzer 2, the other terminal of which is connected by lead 15 to a contact 16 secured on the slotted reverse plate 17 of the automobile, but insulated from said plate by a block of insulation 18 interposed between it and the plate. A contact 19 is secured to the gear shift lever 20 of the automobile. A lead 21 connects the lead 11 and contact 19. A standard slow-acting interrupter 25 is provided for interrupting the current passing through the lamp 1. The coil 26 of the interrupter is connected by a lead 27 to lead 15, and by lead 28 to a contact 29 adapted to engage the contact bar 30 of the interrupter. A lead 31 connects the other terminal of lamp 1 to a contact 32 which also engages the interrupter contact bar 30. A lead 33 connects contact bar 30 and lead 14. A terminal 34 of switch 12 is connected to lead 15.

The operation of my device is as follows:

At night connection is established between leads 11 and 13 by the switch 12 and the lamp 1 is lighted in the usual way by the battery 10 through lead 11, switch 12, lead 13, lead 31, contact 32, contact bar 30, lead 33 and lead 14. Upon swinging the shift lever 20 to reverse the automobile, the contact 19 engages contact 16, whereupon the buzzer 2 is operated and an alarm sounded by battery 10, through lead 11, lead 21, contacts 19 and 16, lead 15, and lead 14, and the interrupter 25 is operated by the battery through leads 11, 21, contacts 19 and 16, leads 15 and 27, magnet coil 26, lead 28, contact 29, contact bar 30, lead 33 and lead 14, which alternately causes the engagement and disengagement of the contact bar 30 and contact 32 and interrupts the current passing through the lamp 1, causing the light of the lamp to flicker which is the signal that the automobile is going to back.

In the daytime by means of switch 12 connection between leads 11 and 13 is broken and connection between lead 15 from contact 34 to lead 13 is established which breaks the lamp circuit and places the lamp 1 directly under control of the gear shift lever 20. In the daytime when the gear shift lever is swung into reverse position, the buzzer 2 is sounded as before described, while the lamp is caused to flicker by the current from battery 10 through leads 11 and 21, contacts 19 and 16, lead 15, switch 12, leads 13 and 31, contact 32, contact bar 30 and leads 33 and 14.

Having described my invention, I claim:

1. In a device of the character described, a battery, a two way switch, a tail lamp of an automobile, and an audible alarm, a lead from one side of the battery to the two way switch, a second lead from the two way switch to one side of the tail lamp, a second switch operated by a control lever, a third lead from the same side of the battery to one side of the second switch, a fourth lead from the second switch to the audible alarm and a connection from the latter to the other side of the battery, the two way switch serving to connect the first and second leads to light the lamp or to connect the second and fourth leads to break the circuit of the lamp when the second switch is open, an electro-magnetic interrupter comprising a coil, an armature and two stationary contacts closed by the armature in its normal position, a fifth lead connecting the fourth lead and the coil of the interrupter, a sixth lead connecting the coil to one of the stationary contacts, a connection between the movable contact and the other side of the battery and a lead connecting the other side of the lamp to the second stationary contact.

2. In a device of the character described, a battery, a two way switch, a tail lamp of an automobile, and an audible alarm, a lead from one side of the battery to the two way switch, a second lead from the two way switch to one side of the tail lamp, a second switch operated by a control lever, a third lead from the same side of the battery to one side of the second switch, a fourth lead from the second switch to the audible alarm and a connection from the latter to the other side of the battery, the two way switch serving to connect the first and second leads to light the lamp or to connect the second and fourth leads to break the circuit of the lamp when the second switch is open, circuit interrupting means including a movable and a stationary contact normally in circuit closing position and electro-magnetic means for operating said movable contact, connections between the other side of the control lever switch and the electro-magnetic interrupter means, and between the latter and the other side of the battery and additional connections from the lamp to the other side of the battery including the contacts of the interrupter.

In testimony whereof I affix my signature.

EDGAR M. SANBORN.